(12) United States Patent
Keller

(10) Patent No.: US 9,097,355 B2
(45) Date of Patent: Aug. 4, 2015

(54) VALVE FOR INTEGRATING INTO A SANITARY APPLIANCE

(75) Inventor: Hans Keller, Zurich (CH)

(73) Assignee: Enswico IP AG, Sarnen (CH)

( * ) Notice: Subject to any disclaimer, the term of this patent is extended or adjusted under 35 U.S.C. 154(b) by 168 days.

(21) Appl. No.: 13/636,738

(22) PCT Filed: Mar. 25, 2011

(86) PCT No.: PCT/CH2011/000062
§ 371 (c)(1),
(2), (4) Date: Sep. 24, 2012

(87) PCT Pub. No.: WO2011/120177
PCT Pub. Date: Oct. 6, 2011

(65) Prior Publication Data
US 2013/0015388 A1      Jan. 17, 2013

(30) Foreign Application Priority Data

Mar. 30, 2010   (CH) ..................................... 0466/10

(51) Int. Cl.
*F16K 15/14*   (2006.01)
*E03C 1/298*   (2006.01)
(52) U.S. Cl.
CPC .............. *F16K 15/147* (2013.01); *E03C 1/298* (2013.01)
(58) Field of Classification Search
CPC .............................. F16K 15/147; F16K 15/144

USPC ....................... 137/513.3, 846, 848, 849, 850
See application file for complete search history.

(56) References Cited

U.S. PATENT DOCUMENTS

| 3,047,013 | A  | * | 7/1962  | Baumbach ..................... 137/849 |
| 3,967,645 | A  |   | 7/1976  | Gregory |
| 4,340,977 | A  | * | 7/1982  | Brownlee et al. ............. 623/2.16 |
| 4,387,749 | A  | * | 6/1983  | Donisi ............................. 141/68 |
| 5,193,585 | A  | * | 3/1993  | Proffitt et al. ................. 137/846 |
| 7,530,369 | B2 | * | 5/2009  | Anderson ...................... 137/846 |
| 2005/0263195 | A1 | * | 12/2005 | Dahm ........................... 137/846 |
| 2006/0118189 | A1 | * | 6/2006  | Tekulve et al. ................ 137/846 |
| 2006/0253084 | A1 |   | 11/2006 | Nordgren |
| 2010/0219293 | A1 | * | 9/2010  | Seibt et al. .................. 244/118.5 |

FOREIGN PATENT DOCUMENTS

| EP | 1174549   | 1/2002 |
| EP | 1477617   | 11/2004 |
| WO | 2004059198 | 7/2004 |

* cited by examiner

*Primary Examiner* — Jessica Cahill
(74) *Attorney, Agent, or Firm* — Volpe and Koenig, P.C.

(57) ABSTRACT

A valve (9) for integrating into a sanitary appliance e.g. a urinal (1), including two lug-type elements (21) that are arranged parallel to each other on the lower end of a funnel-shaped inflow section (17). The elements (21) are interconnected on the ends of the lower edge (23). Slits (33) can also be made in the elements (21), enabling the escape of liquid when there is a large amount of throughflow.

9 Claims, 3 Drawing Sheets

VALVE FOR INTEGRATING INTO A SANITARY APPLIANCE

BACKGROUND

Figure 1:
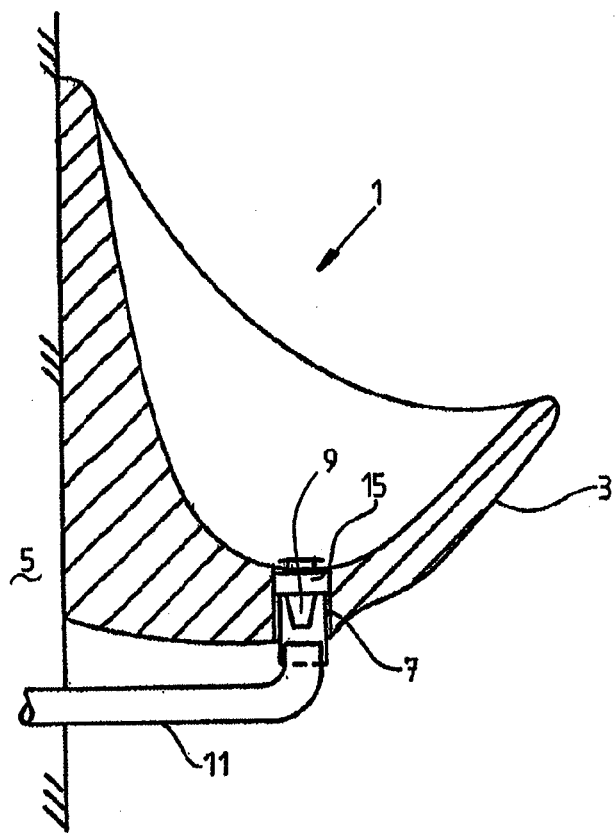

The objective of the invention is a valve for integrating into a sanitary appliance according to the invention.

Sanitary appliances such as urinals require a large amount of water for flushing. On the one hand, this is today very rare in many areas of the world and, on the other hand, in industrialized countries this leads to high costs for waste water treatment. Accordingly, various valves have been marketed not requiring any flushing, i.e. the urine drains via the valve and it seals so tight that no odor from the sewer system can rise into the bathroom. Some of these valves for waterless urinals use a blocking liquid. However, such liquids are not very beneficial for the environment, over time they lose their effectiveness, and they must be refilled/replaced in relatively short intervals. This leads to high production costs, on the one hand, and to operating costs during operation, on the other hand, which in any case is not very popular with the cleaning crews.

A valve is known from EP 1 579 133 which exhibits a funnel-shaped inlet section at the top and two flaps following at the bottom of the inlet section connected at the upper edge to the inlet section. When liquid (urine) is supplied the two flaps are pressed apart and the liquid can drain not only towards the bottom but also laterally. As soon as the liquid supply is interrupted the two flaps nestle against each other and thus completely seal the drain pipe below the urinal from the bathroom. Such valves require no maintenance and remain free from residue and thus they are always ready to use for thousands of operations.

When the urinals are professionally cleaned, for example using suitable liquids, the functionality is lastingly ensured. However, due to the fact that the cleaning crews frequently use extremely harsh cleaning solutions and chemicals, as customary for cleaning conventional water-flushed urinals, the risk is given that the very thin flaps deform and thus a lastingly mutual contacting cannot be ensured over the long term.

The objective of the present invention is to further develop the valve such that even in case of inappropriate use of cleaning solutions the valve remains functional over an extended period of time and for thousands of applications.

Further, it has shown that when a very large amount of water is supplied, e.g., when cleaning crews pour the dirty water into the urinal after having cleaned the floor the through flow of this liquid is very low and thus the risk develops that due to impatience it is attempted to accelerate the draining process with the use of some tools, e.g., screw drivers. Here, the very sensitive valve may be damaged and thus its effect is immediately lost.

Accordingly, another objective of the present invention is to further develop the valve such that even larger amounts of through flows are possible without here the valve causing a backup.

This objective is attained in a valve including the features of claim 1.

The valve according to the invention further allows draining liquids both along the lateral edges as well as the bottom edge, which preferably is aligned diagonally; on the other hand the connections between the two flap-shaped elements prevent any deformation of the flaps and thus the loss of the seal.

By providing openings in the flap-shaped elements according to claim 6 a flow through amount far exceeding the normal amounts can be easily drained so that any backup is avoided.

Figure 2:
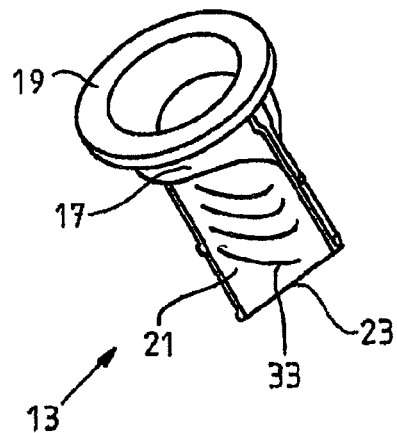
Figure 3:
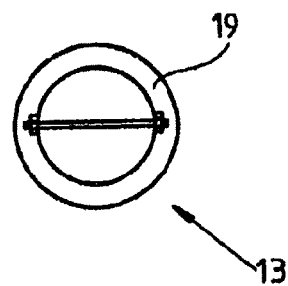
Figure 4:
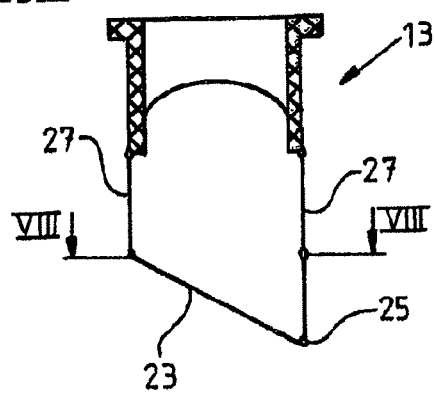
Figure 5:
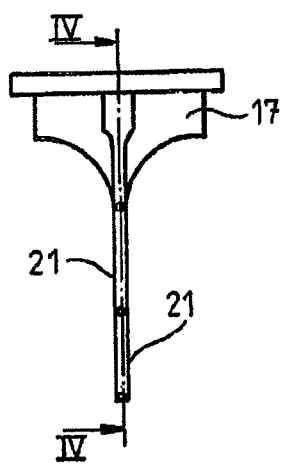
Figure 6:
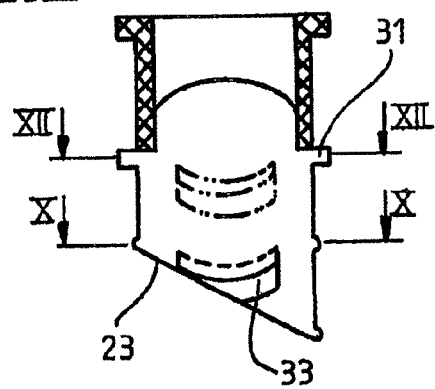
Figure 7:
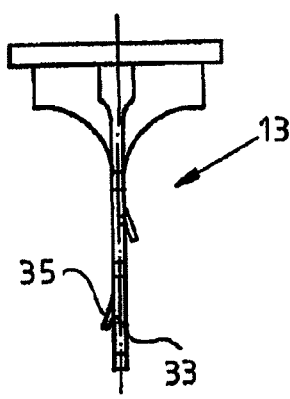
Figure 8:
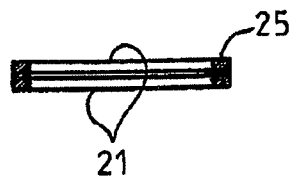
Figure 9:
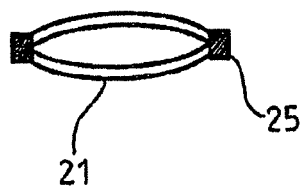
Figure 10:
Figure 11:
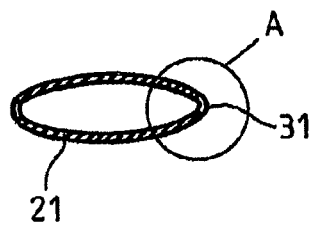
Figure 12:
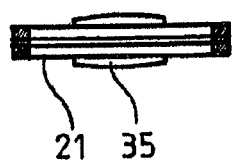
Figure 13:
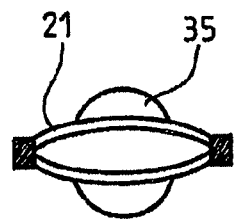
Figure 14:
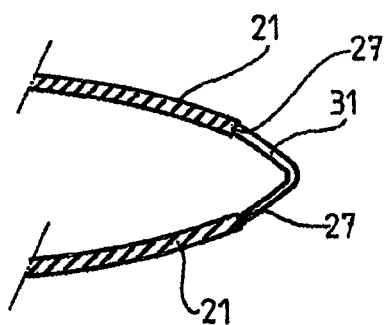

Based on illustrated exemplary embodiments the invention is explained in greater detail. Shown are:

FIG. 1 is a cross-sectional view through a urinal with a valve inserted here,

FIG. 2 is a perspective view of a valve body 13 according to the invention with the adapter 15 receiving the valve body being omitted, with the exterior diameter of the adapter being adjusted to the cross-section of the penetrating bore in the urinal, FIG. 3 is a top view of the valve body, FIG. 4 is a valve cross-sectional view through the valve body along the line IV-IV in FIG. 5, FIG. 5 is a side view of the valve body, FIG. 6 is a vertical cross-sectional view of a valve body of another embodiment of the invention, FIG. 7 is a side view of the valve body according to FIG. 6, FIG. 8 is a horizontal cross-sectional view through the valve body along the line VIII-VIII in FIG. 4 without any through flow, FIG. 9 is a horizontal cross-sectional view through the valve body along the line VIII-VIII in FIG. 4 with through flow, extended due to the liquid flowing through, FIG. 10 is a horizontal cross-sectional view through the valve body along the line X-X in FIG. 6, FIG. 11 is a horizontal cross-sectional view through the valve body along the line X-X in FIG. 6, expanded due to liquid, FIG. 12 is a cross-sectional view through the valve body according to the line XII-XII in FIG. 6, FIG. 13 is a cross-sectional view through the valve body according to the line XII-XII in FIG. 6, expanded and with its gills spread, and FIG. 14 is an enlarged view of the edge region A in FIG. 11.

FIG. 1 shows a vertical cross-section through a urinal 1, comprising a receiving area 3 made from ceramics, metal, or plastic. The urinal 1 is fastened to a wall 5. A valve 9 is inserted in a penetrating bore 7 at the lowest point of the receiving area 3. The valve 9 is connected to a drain pipe 11, which leads to the sewer system, not shown. The valve 9 may also be inserted in differently shaped sanitary appliances, such as urinal grooves and the like and performs the function of a siphon.

The valve body 2 according to FIG. 1 comprises a funnel-shaped inlet section 17, with a flange 19 being embodied at its upper edge for fastening the valve body 13 to the adapter. At the bottom edge of the linearly tapering funnel-shaped inlet section 17 two flap-shaped elements 21 follow, which contact each other in a flat manner and preferably end in a diagonally extending bottom edge 23. In the first exemplary embodiment according to FIGS. 2 through 5 the flap-shaped elements 21 are mutually connected at the ends of the bottom edge 23 by welding or adhesion points 25, connections 25 for short. The sections of the bottom edge 23 located between the points and the lateral edges 27 of the two flap-shaped elements 21 are not connected, i.e. they also allow the lateral drainage of liquid, when it flows from the top through the valve body 13. In addition to the individual connections 25 at the bottom ends of the lateral edge 27 one or perhaps two additional connections 25 may be provided.

In the embodiment according to the FIGS. 6, 7, and 10 through 14 of the invention the connections 25 of the two flap-shaped elements 21 are not fastened inside the elements 21 but at bulges 31, i.e. the trapezoidal area of the elements 21 is not contacted by the connections 25. Accordingly, the full flow-through cross-section remains for the liquid. In the embodiment according to FIG. 6 (top) and FIG. 11 no glue or welding spots are provided at the lateral edges 27 but loop-shaped connections at the bulges 31 projecting outwardly in a band or thread shaped manner, embodied between the edges positioned over top of each other, cf. particularly FIG. 14. When liquid flows through they allow the lateral drainage, i.e. between the edges 27 also in the area of the connections 25.

In a preferred embodiment of the invention according to FIGS. 2, 6, 7, 12, and 13 at least one slot 33 is inserted in at least one of the flap-shaped elements 21, which allows in case of increased amounts of flow through, the drainage of liquids not only along the edges 27 and 23 but additionally through the elements 21. Here, several parallel arranged slots 33 may be provided, embodied straight or curved, either in only one element 21 or in both elements 21. The slots 33 may be embodied located opposite each other or off-set in reference to each other, as displayed in FIG. 6 in dot-dash lines. In the embodiment of the slots 33 according to FIG. 7 they are covered by "gills" 35, i.e. when no flow-through occurs the gills 35 are located over the slots 33 contacting the elements 21 and cover them in a sealing fashion. In case of large amounts of flow through the gills 35 separate from the slot 33. The gills are similar to those of fish.

The invention claimed is:

1. A valve for integrating in a sanitary appliance, comprising a funnel-shaped inlet section with an upper flange defining a top area and a sealing section with two flap-shaped elements that extend downwardly away from the top area, each of the two flap-shaped elements are onnected at an upper side with the inlet section for contacting each other, adjacent lateral edges of the flap-shaped elements (21) have an opening defined therebetween, and the adjacent lateral edges of the flap-shaped elements are connected to each other at least at one point at bottom edges (23) of the flap-shaped elements, opposite from the upper sides by connections (25, 31), the valve having an additional opening between the bottom edges and opposite an inlet opening at the upper flange top area.

2. A valve according to claim 1, wherein the connections (25) at the bottom edges (23, 27) occur by way of welding, adhesion, or with connection elements (31).

3. A valve according to claim 1, wherein the connections are located directly at the bottom edges (23, 27) or offset inwardly or on flaps projecting outwardly from the edges.

4. A valve according to claim 1, wherein the connections are formed from thread or band-shaped loops (31), which connect the lateral edges (27) located over top of each other.

5. A valve according to claim 1, wherein above the connections, located at the bottom edges, one or more additional connections are provided.

6. A valve according to claim 1, wherein at least one slot-shaped opening (33) is embodied on at least one of the flap-shaped elements (21) for liquid to drain, through which an amount of liquid flowing therethrough is increased in reference to a valve without any slots.

7. A valve according to claim 6, wherein a plurality the openings (33) are formed with gills covering the openings (33) and aligned in a direction of flow of liquids.

8. A valve according to claim 6, wherein several of the openings (33) are embodied side-by-side at least in one of the flap-shaped elements (21).

9. A valve according to claim 8, wherein the openings (33) are located opposite each other in the two flap-shaped elements (21) or off-set in reference to each other.

* * * * *